Figure 1:
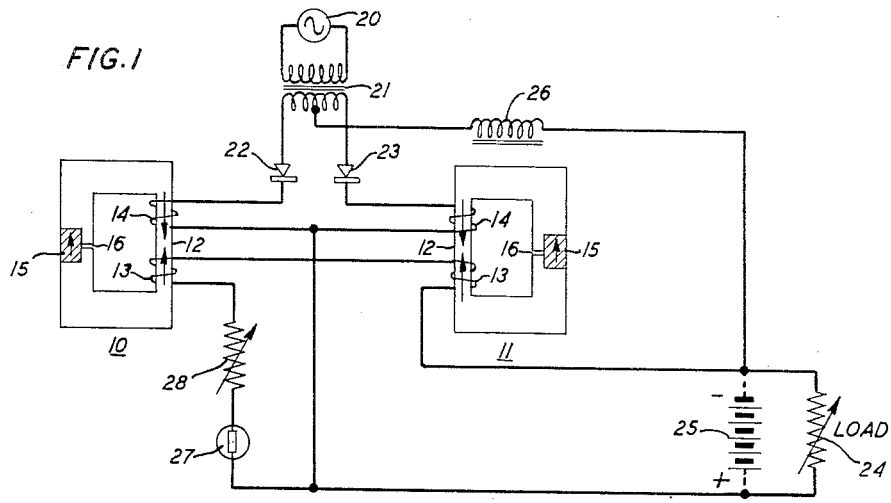

Nov. 9, 1954  D. H. SMITH  2,694,178
ELECTROMAGNETIC CONTROL APPARATUS
Filed Oct. 30, 1951

INVENTOR
D. H. SMITH
BY
G. F. Heuerman
ATTORNEY

United States Patent Office 2,694,178
Patented Nov. 9, 1954

2,694,178

ELECTROMAGNETIC CONTROL APPARATUS

Donald H. Smith, Morristown, N. J., assignor to Bell Telephone Laboratories, Incorporated, New York, N. Y., a corporation of New York Application October 30, 1951, Serial No. 253,938

12 Claims. (Cl. 323—66)

This invention relates to electromagnetic control apparatus and particularly to such control apparatus for controlling the supply of current from a current source to a load.

An object of the invention is to provide improved current or voltage regulating apparatus of the type including a saturable magnetic device.

In accordance with an embodiment of the invention herein shown and described for the purpose of illustration, there is provided at least one device comprising a core of saturable magnetic material on which are wound two windings herein designated a control winding and an output winding. The saturable core forms a part of a magnetic circuit including a permanent magnet for setting up a unidirectional magnetomotive force therein. Current from an alternating-current source is supplied through the output winding and through an asymmetrically conducting device or varistor, for example, a selenium or copper oxide rectifier, to a circuit which, for example, may include a load and a battery connected across the load, thereby setting up in the magnetic circuit a second unidirectional magnetomotive force in aiding relationship with respect to the first magnetomotive force. A portion at least of the load voltage is impressed upon a control circuit comprising the control winding to cause to be set up in the magnetic circuit a third unidirectional magnetomotive force which is in opposition to the first and second magnetomotive forces. This control circuit preferably includes a variable resistance element for initially adjusting the current in the circuit and also a thermistor the resistance of which decreases with increasing temperature to compensate for the change of resistance of the control winding with varying ambient temperature. Two magnetic control devices and two rectifying elements are preferably provided so that full wave rectified current may be supplied through the output windings of the magnetic devices to the load circuit. The core on which the windings are wound is preferably made of steel or a suitable alloy of nickel, iron and cobalt, for example, having a very high permeability at low values of flux density and a sharp bend in its magnetization curve at the points where the flux, in one direction or the other, is sufficient to saturate the core.

For a predetermined, desired battery voltage, the current in the control winding of each magnetic device is adjusted so that the magnetomotive force due to the control winding is substantially equal and opposed to the magnetomotive force due to the permanent magnet. There is then supplied through the output windings and the asymmetrically conducting elements to the load circuit a current of sufficient amplitude to satisfy the requirements of the load. If the voltage across the load should increase slightly to cause a slight increase of the magnetomotive force set up by the control winding, the magnetomotive force due to current in the output winding would reduce the flux in the core, thereby increasing the impedance of the output winding and reducing the current supplied to the load circuit. If a slight decrease of load voltage should occur, causing a decrease of the magnetomotive force set up by the control winding, the magnetomotive force due to current in the output winding would increase the flux in the core, thereby decreasing the impedance of the output winding and increasing the current supplied to the load circuit. For somewhat larger changes of load voltage which may be caused by load changes, the current supplied by the rectifier to the load circuit will decrease to a low amplitude near zero in response to an increase of load voltage or increase to an amplitude sufficiently large to quickly recharge the battery in response to a decrease of load voltage, thereby restoring the voltage across the battery and load to a normal value.

In a modified arrangement, there is provided for supplying direct current to a load circuit a motor driven generator having a field winding the energization of which is controlled in response to the rectified current flowing through the output windings of the magnetic control devices. The rectified current flowing through the output windings of the magnetic control devices need not be supplied directly to the load or to the field winding of the generator which supplies current to the load. Instead, an auxiliary rectifier may be employed for supplying current to the load or to the field winding, a saturable reactor having a saturating winding energized by the current flowing through the output windings being provided for controlling the current supplied from an alternating-current supply source to the auxiliary rectifier.

Figure 2:
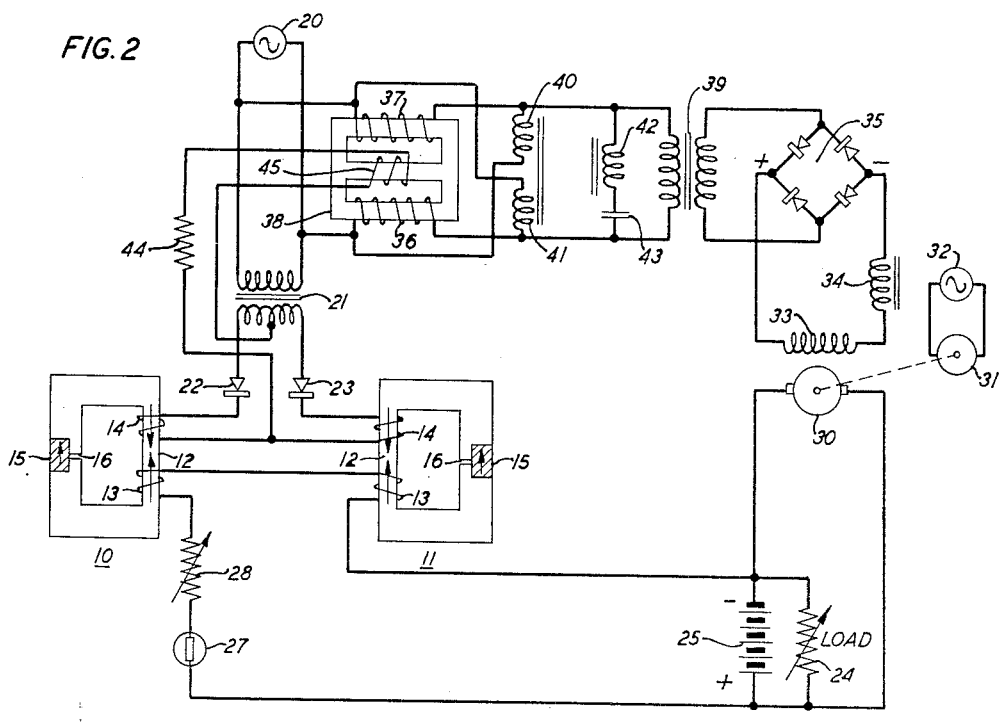

Fig. 1 of the accompanying drawing is a schematic view of a current supply circuit embodying the invention; and Fig. 2 is a schematic view of a modification of the current supply circuit of Fig. 1.

Referring now to Fig. 1 of the drawing, there are provided two similar electromagnetic control devices 10 and 11. Each device comprises a core 12 of saturable magnetic material on which are wound a control winding 13 and an output winding 14. The core 12 forms a part of a magnetic circuit which includes a permanent magnet 15 for setting up in the magnetic circuit a first unidirectional magnetomotive force. An air gap 16 is provided in the magnetic circuit so as to minimize any changes of magnetomotive force of the permanent magnet due to currents in windings 13 and 14. The core 12 is preferably made of steel or a suitable alloy of nickel, iron and cobalt, for example, having a very high permeability at low values of flux density and a sharp bend in its characteristic magnetization curve at a point where the flux in one direction or the other is of sufficient magnitude to saturate the core. The remaining portion of the magnetic circuit, except the permanent magnet, may be made of low permeability transformer iron, for example, and have a larger cross-section than that of the core portion 12.

Current from an alternating-current source 20 is supplied through a transformer 21, asymmetrically conducting devices or varistors 22 and 23, such as selenium rectifier elements, and through output windings 14 to a load circuit comprising a variable load 24, across which a battery 25 may be connected, and a reactor 26 in a path connecting the negative load terminal to a mid-tap of the secondary winding of transformer 21. Full wave rectified current is thus supplied to the load circuit, half cycles of one polarity of the alternating-current source flowing through varistor 22 and the output winding 14 of the control device 10 and half cycles of opposite polarity of the alternating-current source flowing through varistor 23 and the output winding 14 of the control device 11. The voltage across the load 24 and battery 25, or a portion of said load voltage which may be derived by means of a voltage dividing circuit connected across the load, for example, is impressed upon a circuit comprising a directly heated thermistor 27, a variable resistor 28 and the control windings 13, all in series. Thermistors are described in an article by G. L. Pearson on page 106 of "Bell Laboratories Record" for December, 1940. The thermistor 27 has the characteristic that its resistance decreases as the current flowing through it increases, thus causing the current in the circuit to change at a faster rate than the voltage impressed upon the circuit.

The windings 13 and 14 are so wound upon the core 12 that the relative directions of the unidirectional magnetomotive forces set up in the core by the permanent magnet 15 and by the currents in windings 13 and 14 respectively, are as indicated by the arrows. As shown, the unidirectional magnetomotive force due to current in winding 13 is opposed to the magnetomotive force due to the permanent magnet and is also opposed to the unidirectional magnetomotive force due to current in winding 14. In operation, the flux due to the resultant of the three component magnetomotive forces may flow in one direction or the other, depending on the magnitudes of the respective magnetomotive forces, and the magnitude of the flux may, under certain conditions, be sufficient to saturate the core.

When the voltage across the load 24 and battery 25 has a desired predetermined value, the current flowing through control windings 13 is adjusted by means of the variable resistor 28 so that the magnetomotive force set up in a magnetic circuit by its control winding 13 is substantially equal to that of a permanent magnet 15. There is then supplied through the asymmetrically conducting varistors 22 and 23 and the output windings 14 to the load circuit a current of sufficient amplitude to satisfy the requirements of the load. If the voltage across the battery and the load should then increase by a very small amount, the magnetomotive force due to a control winding 13 increases so that the resultant of this magnetomotive force and that of the permanent magnet 15 has a direction which is opposed to the magnetomotive force due to the output winding 14. The magnetomotive force due to current in output winding 14 therefore causes a reduction of the flux in the core, thereby increasing the impedance of output winding 14 and causing a reduction of the current supplied to the load circuit. If the voltage across the battery 25 and load 24 should decrease by a very small amount, the magnetomotive force due to a control winding 13 would decrease so that the resultant of this magnetomotive force and that of a permanent magnet 15 has a direction which aids the magnetomotive force due to an output winding 14. Under this condition, the magnetomotive force due to current in output winding 14 causes an increase of flux in the core 12, thereby decreasing the impedance of output winding 14 and causing an increase of the rectified current supplied to the load circuit.

When the changes of the voltage across the load 24 and battery 25 are still small but somewhat larger than the slight voltage changes referred to in the preceding paragraph, the current supplied through the varistors 22 and 23 and output windings 14 to the load circuit will change from a small amplitude near zero when the battery voltage is high to a maximum amplitude sufficient to quickly recharge the battery when the battery voltage is low. Such changes of the voltage across the battery and the load may be caused by changes of load.

For a decrease of load voltage of the order of magnitude referred to in the preceding paragraph, the magnetomotive force due to a control winding 13 is sufficiently reduced that the flux in the magnetic circuit due to the difference of the magnetomotive forces set up by the permanent magnet and by the control winding, respectively, substantially completely saturates the core 12. The flux change in the core produced by the current change in the output winding is therefore very small and the voltage across the output winding is likewise very small. Maximum current is therefore supplied to the load circuit for quickly recharging the battery and causing the load voltage to quickly return to a normal value. When, on the other hand, the battery voltage increases by an amount of the order under consideration, the magnetomotive force due to the control winding 13 is sufficiently larger than the magnetomotive force of the permanent magnet 15 that the resultant of these two magnetomotive forces has a direction opposing the magnetomotive force set up due to current in an output winding 14 and a magnitude sufficient to substantially completely saturate the core 12. The current flowing through an output winding 14, due to a voltage pulse in the circuit of a correct polarity to cause current flow through a varistor 22 or 23, will cause the flux in the magnetic circuit including a core 12 to decrease from a magnitude required for producing substantially complete saturation to zero flux and then to increase to a magnitude required for producing substantially complete saturation in the reverse direction. Due to the high rate of change of flux, a voltage nearly equal to the instantaneous voltage of the pulse impressed upon the output circuit is set up across the output winding 14, thereby retarding the increase of current in the output circuit including a winding 14 and the load and maintaining this current at a low value near zero. The time required for changing the flux in the magnetic circuit from a saturating flux in one direction to a saturating flux in the opposite direction is equal to or greater than the time period of a voltage pulse, that is, of a half cycle of the alternating voltage of the source 20. Therefore, for this condition, the average current supplied to the load circuit has a low value near zero. There is thus set up for controlling the battery charging rate a current or voltage which decreases to a small value near zero in response to a predetermined increase of battery voltage and which increases to a certain maximum amplitude in response to a predetermined decrease of battery voltage.

Fig. 2 shows a modification of the current supply apparatus of Fig. 1 and the parts of Fig. 2 which correspond to similar parts of Fig. 1 are designated by the same numerals. In Fig. 2, instead of supplying the rectified current flowing through output windings 14 directly to the load circuit, an auxiliary direct-current source is utilized for supplying current to the load 24 and battery 25, control means being provided for controlling the voltage of the auxiliary source in response to changes of current flowing through output windings 14. Specifically, there is provided for supplying direct current to the load circuit a generator 30 driven by a motor 31 when energized from an alternating-current supply source 32, the generator having a field winding 33 to which is supplied through a reactor 34 a direct current from an auxiliary bridge type rectifier 35. Alternating current from the supply source 20 is supplied through alternating-current windings 36 and 37 of a saturable reactor comprising a three-legged core 38 and through a transformer 39 to the input terminals of auxiliary rectifier 35, windings 36 and 37 being wound on the outer legs of the core. There is provided a reactor having a winding 40 connected across winding 36 and the primary of transformer 39 in series and having a winding 41 connected across winding 37 and the primary of transformer 39 in series. An inductance coil 42 and a condenser 43 in series are connected in a shunt path across the primary of transformer 39 to reduce the amplitude of harmonics introduced by the saturable reactor 38 and thereby to reduce the peak inverse voltage across the elements of rectifier 35. Full wave rectified current is supplied by the circuit comprising varistors 22 and 23 and output windings 14 of the devices 10 and 11 to a circuit comprising in series a resistor 44 and the saturating winding 45 of the saturable reactor which is wound on the middle leg of the core 38.

The full wave rectified current supplied from the rectifying circuit comprising the asymmetrically conducting varistors 22 and 23 to the saturating winding 45 is controlled in response to voltage changes across the load 24 and battery 25 as explained above in connection with Fig. 1. When the load voltage increases from a normal value to an abnormally high value, for example, the current supplied to winding 45 of the saturable reactor decreases to cause the impedance of the windings 36 and 37 of the saturable reactor to increase. The alternating current from source 20 supplied to the rectifier 35 is thus reduced to cause a reduction of the direct current supplied from rectifier 35 to the generator field winding 33. The output voltage of generator 30 and the current supplied to the load circuit are thus reduced until the load voltage decreases to its normal value. So also, when the load voltage is abnormally low, the circuit functions to increase the field current of the generator 30 to cause the generator output voltage to increase and the battery 25 to be charged to bring it to its normal voltage. If desired, of course, the generator 30 of Fig. 2 could be omitted, current being supplied directly from rectifier 35 to the load 24, 25.

What is claimed is:

1. In combination, a core of saturable magnetic material, a control winding and an output winding on said core, a magnetic circuit comprising said core and a permanent magnet for setting up a first unidirectional magnetomotive force in said magnetic circuit, means for impressing a unidirectional control voltage which may vary over a range including a certain minimum and a certain maximum amplitude upon said control winding to cause to be set up in said magnetic circuit a second unidirectional magnetomotive force opposed to said first magnetomotive force, said first and second magnetomotive forces being substantially equal when said control voltage has an amplitude intermediate said minimum and maximum amplitudes, flux in one direction due to said first and second magnetomotive forces substantially completely saturating said core when said control voltage has said minimum amplitude, flux in the opposite direction due to said first and second magnetomotive forces substantially completely saturating said core when said control voltage has said maximum amplitude, an asymmetrically conducting device, a series circuit comprising said output winding and said asymmetrically conducting device in series, and means for impressing upon said series circuit an alternating voltage for causing current in said series circuit to set up intermittently in said magnetic circuit a third unidirectional magnetomotive force aiding the magnetomotive force of said permanent magnet.

2. Mean for controlling the supply of current derived from an alternating-current supply source to a load circuit including a load which comprises a core of saturable magnetic material, a control winding and an output winding on said core, a magnetic circuit comprising said core and a permanent magnet for setting up in said magnetic circuit a first unidirectional magnetomotive force, an asymmetrically conducting device, means for supplying current from said supply source through said output winding and said asymmetrially conducting device in series to said load circuit to set up across said load a unidirectional voltage which may vary over a range including a certain minimum and a certain maximum amplitude, thereby setting up in said magnetic circuit a second unidirectional magnetomotive force in aiding relationship with respect to the magnetomotive force of said permanent magnet, and means for impressing a portion at least of the load voltage upon said control winding to cause to be set up in said magnetic circuit a third unidirectional magnetomotive force in opposition to said first and second magnetomotive forces, said first and third magnetomotive forces being substantially equal when said control voltage has an amplitude intermediate said minimum and maximum amplitudes, flux in one direction due to said first and third magnetomotixe forces substantially completely saturating said core when said control voltage has said minimum amplitude, flux in the opposite direction due to said first and third magnetomotive forces substantially completely saturating said core when said control voltage has said maximum amplitude.

3. In combination, a magnetic circuit comprising a saturable core of magnetic material and a permanent magnet for setting up in said magnetic circuit a first substantially constant unidirectional magnetomotive force, a control winding on said core, a circuit comprising said control winding, means for impressing upon said circuit comprising said control winding a variable unidirectional control voltage for causing the resulting unidirectional current flowing in said control winding to set up in said core a second unidirectional magnetomotive force having a direction opposed to the direction of the first magnetomotive force and a magnitude substantially equal to that of said first magnetomotive force when said control voltage has a predetermined normal value, said second magnetomotive force being sufficiently larger than said first magnetomotive force to cause substantially complete saturation of said core by flux in one direction when said control voltage has a certain maximum value larger than said normal value, said first magnetomotive force being sufficiently larger than said second magnetomotive force to cause substantially complete saturation of said core by flux in the opposite direction when said control voltage has a certain minimum value less than said normal value, an output winding on said core, and means for supplying pulses of unidirectional current to said output winding to cause to be set up in said magnetic circuit a third unidirectional magnetomotive force having a direction opposed to the direction of said second magnetomotive force and aiding with respect to said first magnetomotive force, the amplitude of said unidirectional current pulses varying in response to said variations of said unidirectional control voltage.

4. A combination in accordance with claim 3 in which there is provided means energized by said unidirectional pulsating current for controlling the magnitude of said unidirectional control voltage.

5. A combination in accordance with claim 3 in which said circuit comprising said control winding comprises a directly heated thermistor the resistance of which decreases with an increase in the ambient air temperature.

6. A combination in accordance with claim 3 in which means are provided for adjusting the current in said circuit comprising said control winding.

7. A combination in accordance with claim 4 in which said means for controlling the magnitude of said unidirectional control voltage comprises a storage device and means for supplying said unidirectional pulsating current to said storage device.

8. A combination in accordance with claim 4 in which said means for controlling the magnitude of said unidirectional control voltage comprises a saturable reactor having a saturating winding and means for supplying said unidirectional current to said saturating winding.

9. In combination, two similar electromagnetic devices each comprising a core of saturable magnetic material, a permanent magnet for setting up a first unidirectional magnetomotive force in a magnetic circuit comprising said core and an output winding and a control winding wound on said core, a first electric circuit, means for supplying current from an alternating-current supply source to said first electric circuit comprising a first and a second asymmetrically conducting device, means for supplying current from said source to said circuit through said first asymmetrically conducting device and through a first of said output windings during half cycle periods of one polarity of said source, and means for supplying current from said source to said circuit through said second asymmetrically conducting device and through the second of said output windings during half cycle periods of opposite polarity of said source, said currents flowing through said output windings setting up in the magnetic circuits of said electromagnetic devices respectively unidirectional magnetomotive forces which aid the magnetomotive forces of said permanent magnets respectively, means for deriving from said first electric circuit a variable unidirectional voltage, a second electric circuit comprising said control windings in series of said electromagnetic devices, and means for impressing said derived voltage upon said second circuit to cause to be set up in said magnetic circuits of said electromagnetic devices respectively unidirectional magnetomotive forces which oppose the magnetomotive forces of said permanent magnets respectively, the magnetomotive force set up in each core due to the current in the control winding thereon varying over a range from a minimum value less than a predetermined normal value to a maximum value greater than said normal value, said normal value of said magnetomotive force being substantially equal to the magnetomotive force of said permanent magnet, the resultant of the magnetomotive force of said permanent magnet and said minimum magnetomotive force due to said control winding producing a flux in one direction through said core for substantially completely saturating said core and the resultant of the magnetomotive force of said permanent magnet and said maximum magnetomotive force due to said control winding producing a flux in the opposite direction through said core for substantially completely saturating said core, the magnetomotive force due to said output winding aiding said resultant magnetomotive force when the magnetomotive force due to said control winding has said minimum value and the magnetomotive force due to said output winding opposing said resultant magnetomotive force when the magnetomotive force due to said control winding has said maximum value.

10. A combination in accordance with claim 9 in which there is provided means for adjusting the current in said second electric circuit to make the magnetomotive forces set up in said magnetic circuits due to said control windings substantially equal to the magnetomotive forces of said permanent magnets respectively when said derived voltage has a desired value.

11. In combination, two similar electromagnetic devices each comprising a core of saturable magnetic material, a permanent magnet for setting up a first unidirectional magnetomotive force in a magnetic circuit comprising said core and an output winding and a control winding wound on said core, a first electric circuit, means for supplying current from an alternating-current supply source to said first electric circuit comprising a first and a second asymmetrically conducting device, means for supplying current from said source to said circuit through said first asymmetrically conducting device and through a first of said output windings during half cycle periods of one polarity of said source, and means for supplying current from said source to said circuit through said second asymmetrically conducting device and through the second of said output windings during half cycle periods of opposite polarity of said source, said currents flowing through said output windings setting up in the magnetic circuits of said electromagnetic devices respectively unidirectional magnetomotive forces which aid the magnetomotive forces of said permanent magnets respectively, a source of unidirectional voltage which may vary, a second electric circuit comprising said control windings in series of said electromagnetic devices, means for impressing upon said second circuit a voltage derived from said source of unidirectional voltage to cause to be set up in said magnetic circuits of said electromagnetic devices respectively magnetomotive forces which oppose the magnetomotive forces of said permanent magnets respectively, and means responsive to the current in said first electric circuit for controlling the voltage of said source of unidirectional voltage, the resultant in each core of the magnetomotive force of said permanent magnet and the magnetomotive force due to said control winding varying over a range from a magnitude to cause substantially complete saturation of the core by flux in one direction to a magnitude to cause substantially complete saturation of the core by flux in the opposite direction.

12. A combination in accordance with claim 11 in which said means for controlling the voltage of said source of unidirectional voltage comprises a saturable reactor having a saturating winding, and means for supplying the current in said first electric circuit to said saturating winding to control the impedance of said reactor.

References Cited in the file of this patent

UNITED STATES PATENTS

| Number | Name | Date |
|---|---|---|
| 2,218,711 | Hubbard | Oct. 22, 1940 |
| 2,309,156 | Andrews | Jan. 26, 1943 |
| 2,324,634 | McCreary | July 20, 1943 |
| 2,339,406 | Holden | Jan. 18, 1944 |
| 2,435,062 | Walsh | Jan. 27, 1948 |
| 2,465,352 | Chatterjea et al. | Mar. 29, 1949 |
| 2,473,617 | Stiefel | June 21, 1949 |
| 2,503,880 | Mah | Apr. 11, 1950 |
| 2,560,284 | Grandstaff | July 10, 1951 |
| 2,596,685 | Hedstrom | May 13, 1952 |

FOREIGN PATENTS

| Number | Country | Date |
|---|---|---|
| 685,951 | Germany | Dec. 29, 1939 |